US007831537B2

(12) United States Patent
Grabarnik et al.

(10) Patent No.: US 7,831,537 B2
(45) Date of Patent: Nov. 9, 2010

(54) SYSTEM AND METHOD OF ADAPTIVE GENERATION OF PROBLEM DETERMINATION DECISION PROCEDURES

(75) Inventors: Genady Grabarnik, Scarsdale, NY (US); Sidney L. Hantler, Cortlandt Manor, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/697,132

(22) Filed: Apr. 5, 2007

(65) Prior Publication Data
US 2008/0249975 A1    Oct. 9, 2008

(51) Int. Cl.
  G06F 9/44   (2006.01)
  G06N 7/02   (2006.01)
  G06N 7/06   (2006.01)
(52) U.S. Cl. ...................................... 706/52
(58) Field of Classification Search ............. 706/45–48, 706/52, 54, 59–62
See application file for complete search history.

(56) References Cited
U.S. PATENT DOCUMENTS

| 6,487,513 | B1 * | 11/2002 | Eastvold et al. | 702/108 |
| 7,584,165 | B2 * | 9/2009 | Buchan | 706/60 |
| 2002/0120886 | A1 * | 8/2002 | Nguyen et al. | 714/39 |
| 2005/0050338 | A1 * | 3/2005 | Liang et al. | 713/188 |
| 2006/0117301 | A1 * | 6/2006 | Saunders et al. | 717/124 |
| 2008/0066145 | A1 * | 3/2008 | Molen et al. | 726/1 |
| 2009/0222914 | A1 * | 9/2009 | Ozawa | 726/21 |

OTHER PUBLICATIONS

Tariq Assaf and Joanne Bechta Dugan, "Build Better Diagnostic Decision Trees", IEEE Instrumentation & Measurement Magazine, Aug. 2005, pp. 48-53.*
IBM, "Autonomic Computing: IBM's Perspective on the State of Information Technology", available at: http://www.research.ibm.com/autonomic/manifesto/, accessed Sep. 23, 2009.*
Jeffery O. Kephart and David M. Chess, "The Vision of Autonomic Computing", Computer (IEEE), vol. 36, Is. 1, Jan. 2003.*
IBM, "Autonomic Computing: IBM's Perspective on the State of Information Technology", available since at least Jan. 17, 2006; archived copy available at http://web.archive.org/web/20060208103500/www.research.ibm.com/autonomic/manifesto/autonomic_computing.pdf accessed Mar. 1, 2010.*
S. Rao Kosaraju, et al., "On an Optimal Split Tree Problem", WADS'99, LNCS 1663, 1999, pp. 157-168.
Alina Beygelzimer, et al., "Test-Based Diagnosis: Tree and Matrix Representations", IEEE, 2005.

\* cited by examiner

*Primary Examiner*—Donald Sparks
*Assistant Examiner*—Vincent M Gonzales
(74) *Attorney, Agent, or Firm*—Scully, Scott, Murphy & Presser, P.C.; Anne V. Dougherty, Esq.

(57) ABSTRACT

System, method, and program storage device for adaptive generation of problem determination decision procedures are provided. The decision procedures may be used, for example, for isolating problems and determining solutions to the problems in complex systems, such as IT systems and consumer electronics products. In one aspect, an optimal decision procedure is generated from an universal representation of system states and actions.

34 Claims, 5 Drawing Sheets

ORIGINAL DECISION TREE

OPTIMIZED DECISION TREE

- Q1-WINDOWS?
- Q2-BAD DISPLAY?
- Q3-PRE-VISTA?
- Q4-ENOUGH MEMORY?
- A1-FIX DRIVER
- A2-REPLACE DISPLAY
- A3-INSTALL VISTA
- A4-ADD MEMORY
- A5-CONTACT SUPPORT

FIG. 4
UNIVERSAL REPRESENTATION

| Q1 | Q2 | Q3 | Q4 | ACTION |
|----|----|----|----|--------|
| 0  | 0  | 0  | 0  | A1 |
| 0  | 0  | 0  | 1  | A1 |
| 0  | 0  | 1  | 0  | A1 |
| 0  | 0  | 1  | 1  | A1 |
| 0  | 1  | 0  | 0  | A2 |
| 0  | 1  | 0  | 1  | A2 |
| 0  | 1  | 1  | 0  | A2 |
| 0  | 1  | 1  | 1  | A2 |
| 1  | 0  | 0  | 0  | A4 |
| 1  | 0  | 0  | 1  | A5 |
| 1  | 0  | 1  | 0  | A3 |
| 1  | 0  | 1  | 1  | A3 |
| 1  | 1  | 0  | 0  | A4 |
| 1  | 1  | 0  | 1  | A5 |
| 1  | 1  | 1  | 0  | A3 |
| 1  | 1  | 1  | 1  | A3 |

SYSTEM AND METHOD OF ADAPTIVE GENERATION OF PROBLEM DETERMINATION DECISION PROCEDURES

FIELD OF THE INVENTION

The present application generally relates to computer systems, and more particularly to problem isolation and determination for complex systems, for instance, IT systems and consumer electronics products.

BACKGROUND OF THE INVENTION

Problem isolation and determination of problems for complex systems such as information technology (IT) systems and consumer electronics products are time and cost consuming, and often prone to errors. These create significant problems increasingly so because systems are becoming more and more complex and the time scale over which they change is becoming ever shorter. Corporations spend tens of millions of dollars annually training and supporting contact center personnel who have very high turnover rates. Customer satisfaction depends on the ability of the corporation to quickly and correctly identify and resolve customer problems.

Current solutions include document search, case based reasoning, rules based and decision tree systems. Document search is inefficient because it does not take advantage of the extensive structure of the problem resolution knowledge and does not allow efficient knowledge reuse. The other solutions can be inefficient and depend, to a large extent, on the expertise of the individual using them. They are very difficult to maintain and keep up-to-date.

SUMMARY OF THE INVENTION

System, method, and program storage device for adaptive generation of problem determination decision procedures are provided. A system for adaptive generation of problem determination decision procedures in one aspect may include a monitoring module operable to identify changes to system states, to one or more values of the system states, and one or more actions associated with the system states. The system may also include a universal representation module operable to store available knowledge associated with the system states, the one or more actions, and probabilities associated with occurrence of the system states. The system may further include a problem identification to solution mapper module operable to provide a nearly optimal order of interrogating for said one or more values of the system states and further operable to suggest an associated action. The system may also include a problem resolution log monitor module operable to monitor logs of the system states and associated actions. The system may further include a change to update controller operable to receive monitoring information from the monitoring module and the problem resolution log monitor and determine whether the available knowledge associated with the system states, the one or more actions, and the probabilities associated with the system states stored by the universal representation module needs updating.

A system for adaptive generation of problem determination decision procedures in another aspect may include a monitoring module operable to identify changes to system states, to one or more values of the system states, and one or more actions associated with the system states. The system may also include a universal representation module operable to store available knowledge associated with the system states and the one or more actions. The system may further include a problem identification to solution mapper module operable to generate a decision procedure for optimally interrogating for said one or more values of the system states and further operable to suggest an associated action, and a change to update controller operable to receive monitoring information from the monitoring module and determine whether the available knowledge associated with the system states and the one or more actions stored by the universal representation module needs updating.

A method for adaptively generating problem determination decision procedures, in one aspect may include identifying a plurality of system states, one or more values of the system states, one or more actions associated with the system states; generating a universal representation representing the plurality of system states one or more values of the system states, and one or more actions associated with the system states; and generating a mapping of problem identification to solution from the universal representation using an optimization algorithm.

In another aspect, a method for adaptively generating problem determination decision procedures may include monitoring a plurality of system states, one or more values of the system states, and one or more actions associated with the system states; generating a universal representation representing the plurality of system states one or more values of the system states, and one or more actions associated with the system states; generating from the universal representation a decision procedure for determining said one or more values of the system states for suggesting an associated action; and updating the universal representation and the decision procedure based on one or more changes to the system states, to the one or more values of the system states, or to the one or more actions associated with the system states, or combinations thereof.

A program storage device readable by a machine, tangibly embodying a program of instructions executable by the machine to perform above method of adaptively generating problem determination decision procedures is also be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 illustrates samples of an example universal representation showing a combination of answers to questions and corresponding actions that may be taken.

DETAILED DESCRIPTION

A system and method of the present disclosure describes information about problems and their resolution. In one embodiment, the system and method automatically or semi-automatically updates the information while minimizing the time and effort of the personnel updating the information. The system and method generates nearly optimal decision procedures to isolate and resolve problems.

In a system, there exists a set of system states, for example, whether virus detection software is installed or not, whether firewall software is enabled or not. A set of symptoms are associated with various combinations of system states, for example, browser cannot find page or network adapter light is red. Various combinations of system states are associated with one or more actions. For example, an action may be, install virus detection software, reboot system, etc. The actions are generally intended to eliminate symptoms by changing one or more system states. Users of the system, for example, end users, contact center personnel or, if even devices or machines such as intelligent devices, specify symptoms of the problem they are experiencing to the system. The system generates zero or more decision procedures and interrogates the user sequentially for the values of certain system states or other symptoms. Eventually, the decision procedure terminates and suggests zero or more actions. If the symptom no longer occurs, the solution has been discovered. Otherwise, the user iterates the procedure.

Figure 1:
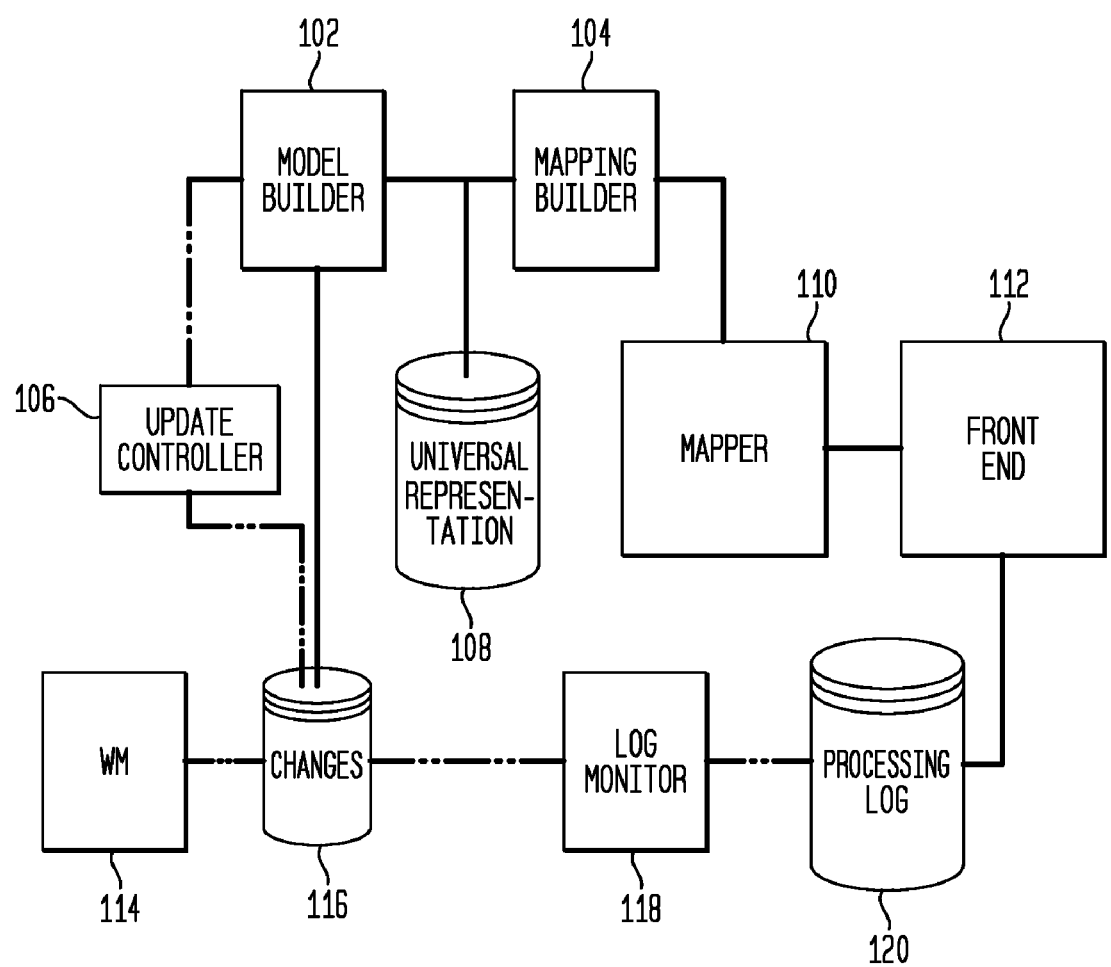
FIG. 1 illustrates processing components of the present application in one embodiment.

FIG. 1 is a diagram illustrating workflow components in one embodiment of the present invention. A computer system such as an IT (information technology) or other systems, and electronic products may encounter various changes and updates to the system. For example, a set of system states may change. An example of such a change may be that a new software release may have error codes not present on previous releases. Values of system states may change, for example, new values of an error code may be reported. The action to be taken for a particular combination of system states may change. For example, a software patch may be released that fixes some of the problems with software package. A new problem and associated action may be discovered, for example, an operating system bug may be reported and an action to fix it discovered. The likelihood of encountering various combinations of system states may change. For example, large numbers of users install patches to software. A real world monitoring (WM) system 114 in one embodiment identifies changes to the system states, to the values of the system states, actions associated with particular system states and new problems associated with particular system states. A universal representation (UniR) 108 in one embodiment stores all available knowledge about system states, actions and associated probabilities describing probabilities of the system to be in some specific state, for instance, in the format that is easy to store and further process. A Mapping Builder (MAB) 104 in one embodiment transforms universal representation into the nearly optimal flowchart, for example, very close to the best possible mapping of problem to solution.

Problem identification to solution mapper (PISM) 110 in one embodiment provides a nearly optimal way of interrogating the user about the values of the symptoms and system states and suggests an associated action. For instance, the interrogation may be performed using the flowchart built by the MAB 104, which graphically represents an optimal interrogating process. Each nonterminal node, beginning at the root (e.g., in FIG. 3B the root is Q1), specifies the name of the question to be asked. Each edge emanating from a nonterminal node is labeled with a possible answer to the question at that node and determines the next node to be visited. This process continues until a terminal node is reached at which point an action is determined.

A user front end system (FES) 112 in one embodiment provides an interface for users to communicate with the problem identification to solution mapper 110. A problem isolation log monitor (PILM) 118 in one embodiment monitors logs of problem resolutions and customer satisfaction, for example, how problems were solved and whether the solution was satisfactory. Logs may be created during the usage of the system. A user such as an operator may manually create the logs or a system component may automatically create the logs. The change to update controller (UC) 106 in one embodiment takes monitoring information from the real world monitoring system 114 and the problem isolation log monitor 118 and decides whether or not the universal representation needs updating. Such decisions may be made whenever sufficient changes occur in the real world. For example, if a new operating system is released and sufficiently many (e.g., a parameter of the system that may be predetermined or depend on a specific system or design choice, etc.) users install that operating system, that operating system is added to the universal representation with its associated frequency estimate. The update controller 106 may decide based on factors such as system parameters, e.g. 5% change to frequency. More complicated policies are also possible, e.g. if the cost of a particular problem is very high every change in the real world may trigger an update. Other examples of system changes that may update the universal representation abound.

The Model Builder (MoB) 102 in one embodiment, upon notification from the Update Controller (UC) 106 extracts information about changes and transforms it into universal representation.

The following provides an example of formalizing a problem. $\{X_i\}$ is a set of random variables (corresponding to observations or symptoms) on a probability space $\{\Omega, \Sigma, P\}$, where $\Omega$ is a state space, $\Sigma$ is a Borel or Lebegue sigma algebra including subsets of $\Omega$, and P is a probability measure on $\Sigma$. A universal representation 108 includes this probability space. A cost $\{c_i\}$ is associated with determining the value of $X_i$. $\Omega$ is partitioned into a set of subsets, A. On each subset there is a preferred action, which drives each state in that subset into a preferred state. One of the subsets corresponding to operational states is associated with the empty action. In one embodiment, we seek a mapping, f, from the values of subsets of the random variables into A; and an algorithm for choosing a sequence $i_1, i_2, \ldots, i_k$ where $i_j$ depends solely on $X_{i_1}, \ldots X_{i_{j-1}}$ such that $P[f(X_{i_1}, \ldots X_{i_k})=A_j]$ exceeds a threshold and the expected cost is sufficiently close to the minimum.

Figure 2:
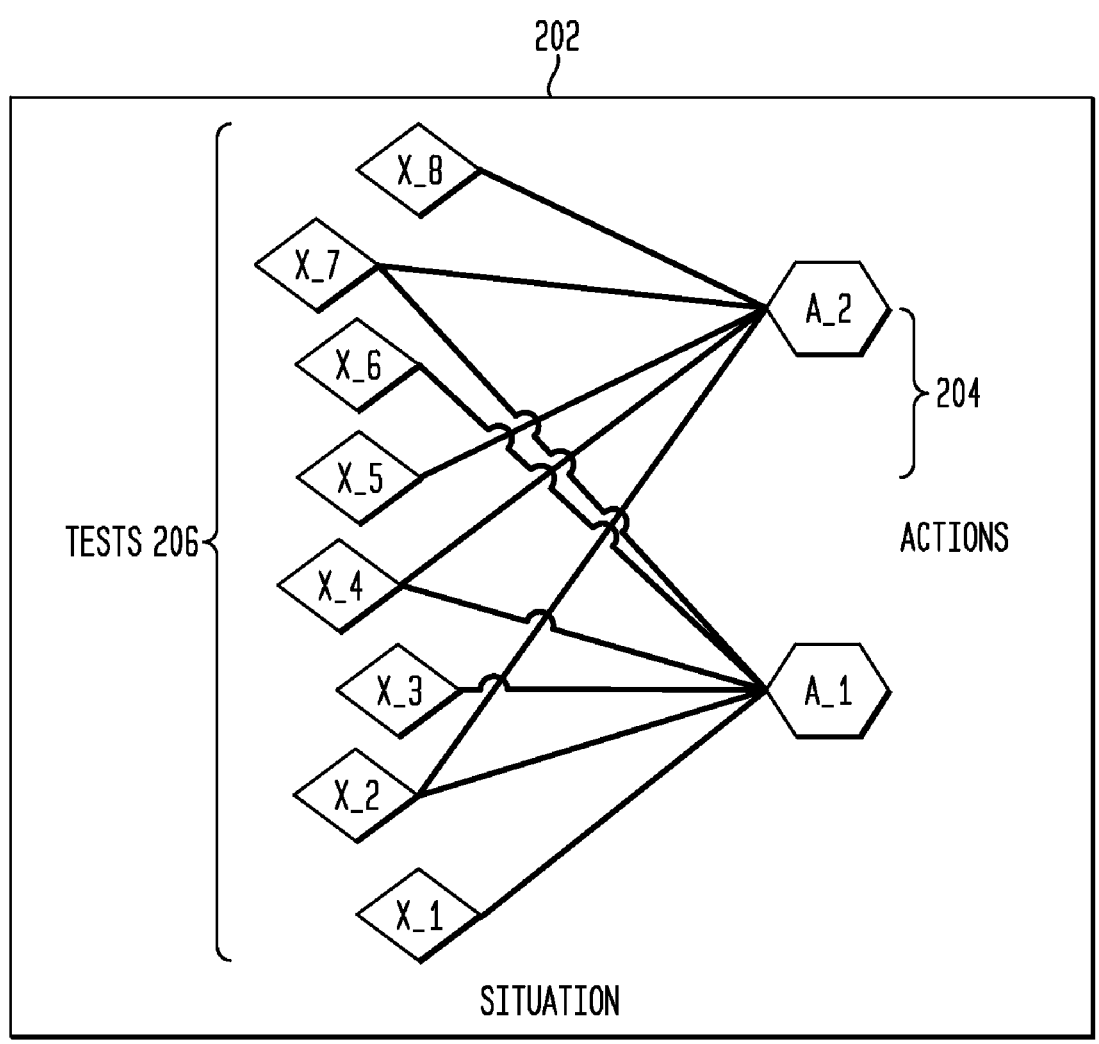
FIG. 2 illustrates a dependency graph illustrating a method of the present disclosure in one embodiment.

FIG. 2 illustrates a dependency graph illustrating a method of the present disclosure in one embodiment. Suppose that each test $X_i$ has only 2 answers $\{0,1\}$, and $\Sigma$ is generated by variables $X_i$. Tests are also referred to as questions in the present disclosure. Suppose the method fixes symptom s. For every action $a_j$, let $A(a_j)$ be the set of all tests $X_i$ such that $a_j$ and $X_i$ are not independent. This maybe expressed as a statement that relative entropy $I(a_j, X_i)$ is not 0. Now create dependency graph such as a simple Bayesian network as follows. There are two sets of tests $X_i$ 204 and sets of actions $a_j$ 202. Connect all tests from $A(a_j)$ with $a_j$.

In one embodiment, a greedy algorithm may be used to find the most informative test with respect to all possible actions. Then information that is provided by actions gets recalculated based on the fact that result of the test is known. This process is repeated recursively until there is additional information to utilize.

Formally, let A={Aj}–action set; X is the set of tests X={$X_i$}. An algorithm, referred to as a greedy algorithm in one embodiment finds optimal test sequences as follows;

1. Let Y be a set of tests to ask. Set Y to $\{\Leftrightarrow\}$ (empty set).
2. Let $X_i$ be the most informative probe with respect to {A,Y},
3. Most informative probe is found from the condition, $$X_i = \mathrm{argmax}_{x_{ij} \in X} 1/c_i H(X_i | A \cup Y),$$

here $H(X_i|A \cup Y)$ is conditional entropy $X_i$ based on knowledge of A and Y, and $c_i$ is a cost of test $X_i$, If there is a tie, choose any test from the tie.
4. Run test $X_i$ and get result $x_i$: $X_i = x_i$
5. Add $XX_i = \{X_i = x_i \, X_i / x_i\}$; $X = X \setminus \{X_i\}$ to the Y: $Y \leftarrow Y \cup XX_i$.
6. Repeat steps 2, 3 until $\max_{x_{ip} X} H(X_i | A \cup Y) > 0$ or until no more tests to run.

This algorithm ends since it is stopped when there are no new information or new tests to run. As a result, the method generates an adaptive (based on the results of tests) sequence of tests to run that defines the system state.

Effectiveness of greedy algorithm is now estimated. If T is an optimal flowchart, $\tau$ is a flowchart obtained using greedy algorithm, and $c(T)$ $(c(\tau))$ are expected costs for flowchart T ($\tau$) then, $c(T) <= c(\tau) <= O(\log n) \, c(T)$, here n is a number of states in the independent partition.

Method of action choice in case when action does not change system state may include:
1. Res←⇔;
2. B←⇔;A←{$A_j$}
3. $A_m \leftarrow \text{argmax}_{A_{ip} A} P(A_j | X_{i0} = x_{i0}, X_{i1} = x_{i1}, \ldots, X_{ik} = x_{ik})$
4. Apply action $A_m$; if symptom is gone result is found. Res←$A_m$, end;
5. B←B $\cup A_m$; A=A\$A_m$;
6. Repeat while Res=⇔& A not⇔;

If Res is not empty then last action repaired symptom, if A is empty—one runs out of possible actions, and may be unable to repair. When action does change system state, apply greedy algorithm again after step 4, and return to the step 1.

Figure 3A:
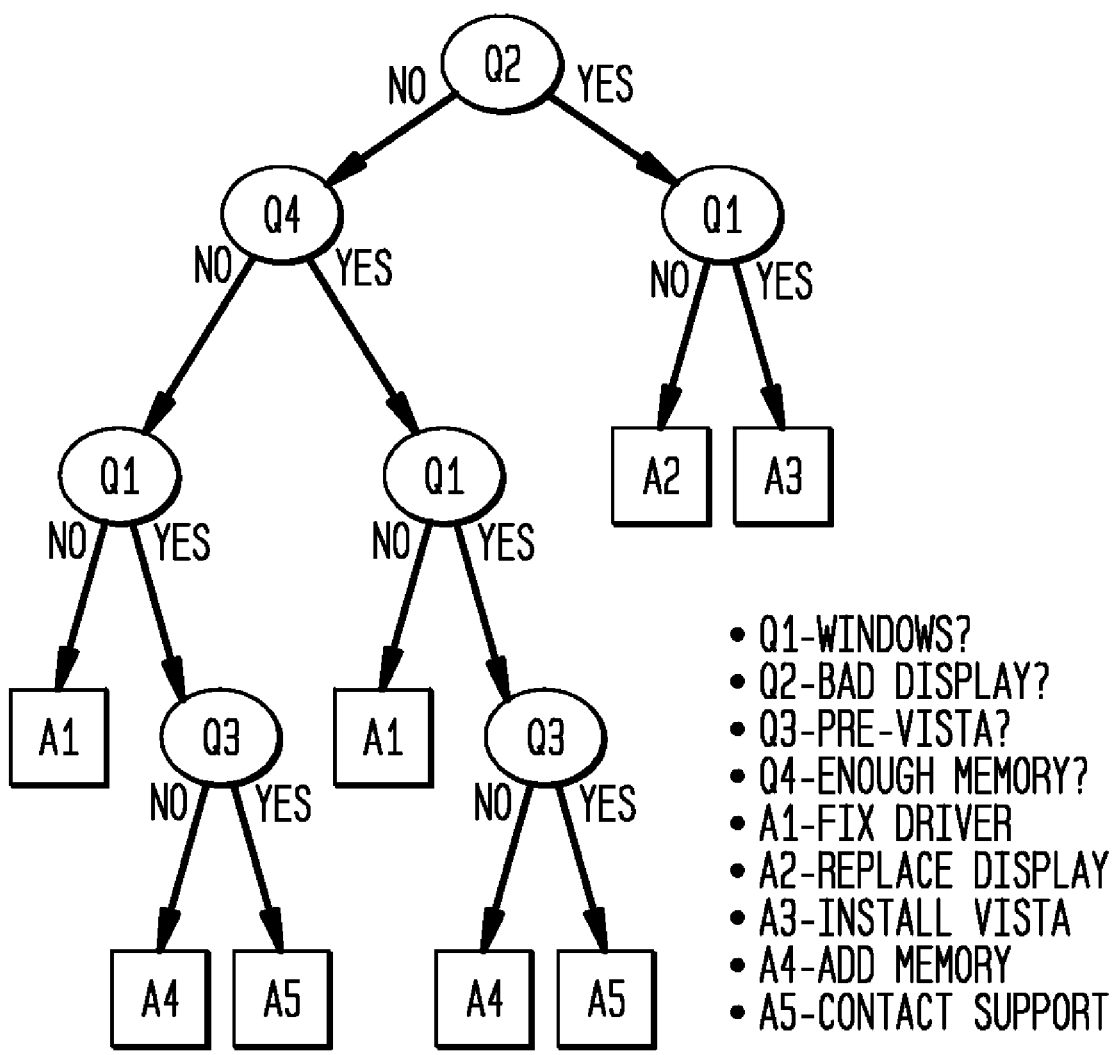
FIGS. 3A and 3B illustrate an original decision tree and an optimized decision tree according to one embodiment of the present disclosure.
Figure 3B:
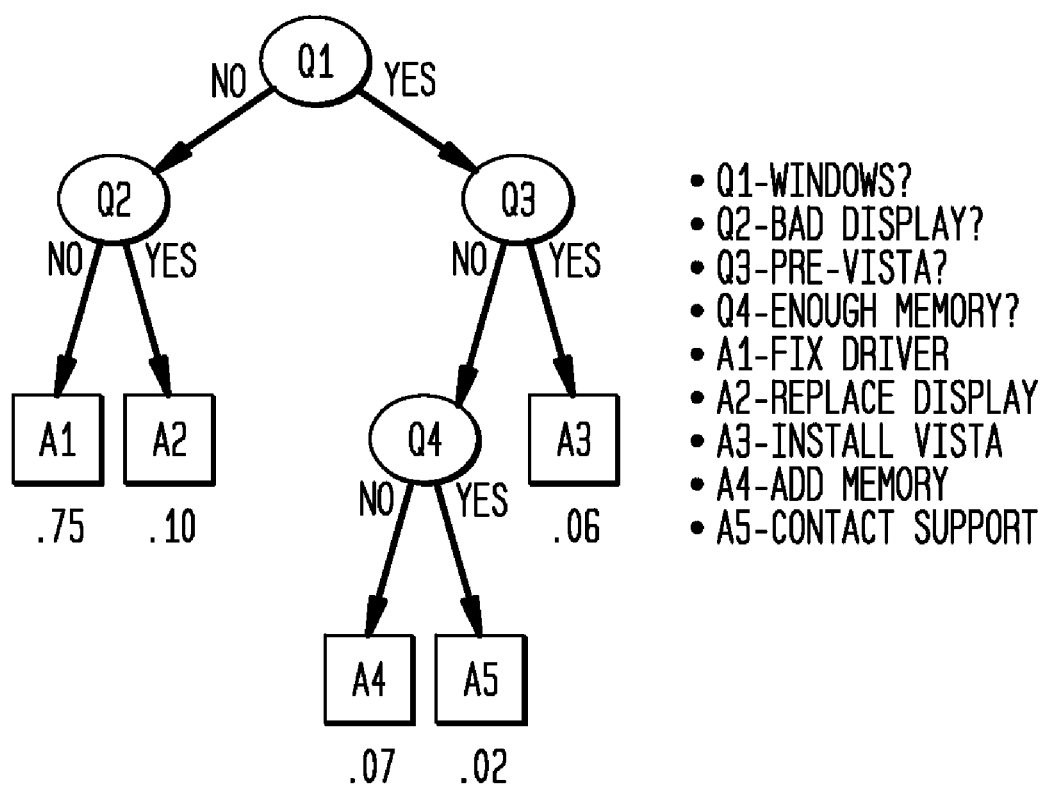

FIGS. 3A and 3B illustrate an original decision tree and an optimized decision tree according to one embodiment of the present disclosure. Consider a system with 16 states in which there are four questions (Q1-Q4) with binary answers that can be asked that completely disambiguate the states. There are five actions (A1-A5) that can be selected. A1 is selected whenever the ordered answers are 0000 0100, 0101. A2 is taken when the answers are 1001 or 1111. A3 is chosen when the answers are 0010 0011 0110 or 0111. A4 is selected when the answers are 1000 or 1010. A5 is selected when the answers are 1110 or 1100.

A compact universal representation may be a binary tree shown in FIG. 3B. This optimized representation, for example, was derived from the original representation shown in FIG. 3A by the mapping builder (FIG. 1, 104) using a greedy algorithm described above, or any other optimizing algorithms. The binary tree at the root asks for the value of Q1. If Q1 is 0, it asks for the value of Q2 and finishes. If Q1 is 1, the binary tree asks the value of Q3. If Q3 is 1 it finishes. If Q3 is 0, it asks the value of Q4 and finishes.

Suppose that A1 happens 75% of the time, A2 happens 10% of the time, A3 happens 6% of the time, A4 happens 7% of the time, and A5 happens 2% of the time as shown in FIG. 3B. By calculating the expected value of the cost of traversing the tree we see that the expected time to solution is nearly optimal.

FIG. 3A illustrates an original decision tree showing examples of questions and corresponding actions based on the answers to the questions. Q1 may be whether the operating system is Windows. Q2 may be a question asking whether the display is bad. Q3 may be asking whether the system is Pre Vista. Q4 may be asking whether there is enough memory. A1 may be an action to fix a driver. A2 may be an action to replace the display. A3 may be an action to install Vista. A4 may be an action to add memory. A5 may be an action to contact support. In the original decision tree shown in FIG. 3A, a number of questions may need to be asked before determining an action. For instance, according to the tree shown in FIG. 3A, action A1 is taken after asking questions, Q2, Q4, and Q1. The system and method of the present disclosure in one embodiment, optimizes such decision trees, for example, using the above-described method.

For example, a universal representation of problems and solutions are optimized using an algorithm such as a greedy algorithm to produce an optimized decision tree shown in FIG. 3B. As shown in FIG. 3B, action A1 is taken as a result of Q1 and Q2, optimizing the number of questions that need to be probed before taking an action. Similarly, actions A4 and A5 are taken after asking 3 questions (Q1, Q3, Q4) in the optimized version shown in FIG. 3B, rather than 4 questions shown in the original decision tree of FIG. 3A. Different approaches including but not limited to various greedy algorithms, other heuristics, other algorithms, exhaustive enumeration of decision trees, etc. may be used for optimization.

FIG. 4 illustrates samples of an example universal representation showing a combination of answers to questions and corresponding actions that may be taken depending on the combination of answers. For instance, the first row 102 shows action A1 to be taken when values of Q1, Q2, Q3, Q4 are all zeros. Similarly, as shown in the fifth row 104, action A2 should be taken when Q2 is one and Q1, Q3, Q4 are zeros. The rest of the entries in FIG. 4 may be interpreted similarly.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality," and may be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for adaptive generation of problem determination decision procedures, comprising:
a processor;
a monitoring module operable to identify changes to system states, to one or more values of the system states, and one or more actions associated with the system states;
a universal representation module operable to store available knowledge associated with the system states, the one or more actions, and probabilities associated with occurrence of the system states;
a problem identification to solution mapper module operable to provide a nearly optimal order of interrogating that minimize number of interrogations for said one or more values of the system states before taking an action, and further operable to suggest an associated action;
a problem resolution log monitor module operable to monitor logs of the system states and associated actions; and
a change to update controller operable to receive monitoring information from the monitoring module and the problem resolution log monitor and determine whether the available knowledge associated with the system states, the one or more actions, and the probabilities associated with the system states stored by the universal representation module needs updating.

2. The system of claim 1, further including:
a front end system operable to provide an interface for one or more users to communicate with the problem identification to solution mapper.

3. The system of claim 1, wherein the problem resolution log monitor module is further operable to log customer satisfaction.

4. The system of claim 1, wherein the system states are associated with a statistical machine having one or more states and one or more actions, in which said one or more states and said one or more actions change.

5. The system of claim 1, wherein one or more combinations of the system states have includes associated one or more symptoms and associated one or more actions.

6. The system of claim 5, wherein said associated one or more actions are for eliminating said associated one or more symptoms by changing one or more of the system states.

7. The system of claim 1, wherein the system states include whether virus detection software is installed or not, whether firewall software is enabled or not, or combination thereof.

8. The system of claim 1, wherein the system is further operable to generates zero or more decision procedures and performs interrogation sequentially for one or more values of selected system states.

9. The system of claim 1, wherein the system is further operable to generates zero or more decision procedures and performs interrogation sequentially for one or more symptoms.

10. The system of claim 1, wherein the problem identification to solution mapper module is further operable to use one or more greedy algorithms to provide a nearly optimal order of interrogating for said one or more values of the system states and further operable to suggest an associated action.

11. The system of claim 1, wherein the problem identification to solution mapper module is further operable to use one or more heuristics to provide a nearly optimal order of interrogating for said one or more values of the system states and further operable to suggest an associated action.

12. The system of claim 1, wherein the universal representation is a decision tree.

13. The system of claim 1, wherein the nearly optimal order of interrogating is presented in a decision tree.

14. The system of claim 1, wherein the monitoring module is further operable to identify one or more new problems associated with the system states.

15. A system for adaptive generation of problem determination decision procedures, comprising:
a processor;
a monitoring module operable to identify changes to system states, to one or more values of the system states, and one or more actions associated with the system states;
a universal representation module operable to store available knowledge associated with the system states and the one or more actions;
a problem identification to solution mapper module operable to generate a decision procedure for optimally interrogating that minimize number of interrogations for said one or more values of the system states before taking an action, and further operable to suggest an associated action; and
a change to update controller operable to receive monitoring information from the monitoring module and determine whether the available knowledge associated with the system states and the one or more actions stored by the universal representation module needs updating.

16. The system of claim 15, further including:
a problem resolution log monitor module operable to monitor logs of the system states and associated actions, wherein the change to update controller is further operable to receive monitoring information from the problem resolution log monitor and determine whether the available knowledge associated with the system states and the one or more actions stored by the universal representation module needs updating.

17. The system of claim 15, wherein the universal representation module further store probabilities associated with occurrence of the one or more system states.

18. The system of claim 15, wherein the problem identification to solution mapper module is operable to generate, using a greedy algorithm, a decision procedure for optimally interrogating for said one or more values of the system states and further operable to suggest an associated action.

19. A method for adaptively generating problem determination decision procedures, comprising:
identifying a plurality of system states, one or more values of the system states, one or more actions associated with the system states;
generating a universal representation representing the plurality of system states, one or more values of the system states, and one or more actions associated with the system states; and
generating, using a processor, a mapping of problem identification to solution from the universal representation using an optimization algorithm,
wherein the universal representation includes at least a combination of answers to questions and a corresponding action to be taken depending on the combination of answers.

20. The method of claim 19, wherein the step of generating includes generating a mapping of problem identification to solution from the universal representation using a greedy algorithm.

21. The method of claim 19, further including:
identifying changes to the plurality of system states, the one or more values of the system states, the one or more actions associated with the system states; and
updating the universal representation based on the identified changes.

22. The method of claim 19, further including:
identifying one or more new problems associated with the system states; and
updating the universal representation based on the identified one or more new problems.

23. The method of claim 19, further including:
monitoring logs associated with the resolving one or more system problems; and
updating the universal representation based on the monitored logs.

24. A method for adaptively generating problem determination decision procedures, comprising:
monitoring a plurality of system states, one or more values of the system states, and one or more actions associated with the system states;
generating a universal representation representing the plurality of system states one or more values of the system states, and one or more actions associated with the system states;

generating, using a processor, from the universal representation a decision procedure for determining said one or more values of the system states for suggesting an associated action; and updating the universal representation and the decision procedure based on one or more changes to the system states, to the one or more values of the system states, or to the one or more actions associated with the system states, or combinations thereof wherein the universal representation includes at least a combination of answers to questions and a corresponding action to be taken depending on the combination of answers.

25. The method of claim 24, wherein the step of generating further includes using an optimization algorithm to generate the decision procedure.

26. The method of claim 24, wherein the step of generating further includes using a greedy algorithm to generate the decision procedure.

27. The method of claim 24, wherein the step of generating further includes using heuristics to generate the decision procedure.

28. The method of claim 24, further including:

monitoring a problem resolution log; and updating the universal representation based on information contained in the problem resolution log.

29. The method of claim 24, wherein the one or more changes includes one or more new problems.

30. A program storage device readable by machine, tangibly embodying a program of instructions executable by the machine to perform a method of adaptively generating problem determination decision procedures, comprising:

monitoring a plurality of system states, one or more values of the system states, and one or more actions associated with the system states;

generating a universal representation representing the plurality of system states, one or more values of the system states, and one or more actions associated with the system states;

generating from the universal representation a decision procedure for determining said one or more values of the system states for suggesting an associated action; and updating the universal representation and the decision procedure based on one or more changes to the system states, to the one or more values of the system states, or to the one or more actions associated with the system states, or combinations thereof, wherein the universal representation includes at least a combination of answers to questions and a corresponding action to be taken depending on the combination of answers.

31. The program storage device of claim 30, wherein the step of generating further includes using an optimization algorithm to generate the decision procedure.

32. The program storage device of claim 30, wherein the step of generating further includes using a greedy algorithm to generate the decision procedure.

33. The program storage device of claim 30, wherein the step of generating further includes using heuristics to generate the decision procedure.

34. The program storage device of claim 30, further including:

monitoring a problem resolution log; and updating the universal representation based on information contained in the problem resolution log.

* * * * *